US006749776B2

(12) United States Patent
Han et al.

(10) Patent No.: US 6,749,776 B2
(45) Date of Patent: Jun. 15, 2004

(54) METHOD FOR RAPID SCREENING OF EMISSION-MIX USING A COMBINATORIAL CHEMISTRY APPROACH

(75) Inventors: Sung Su Han, Niskayuna, NY (US); Sylvain Simon Coulombe, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 441 days.

(21) Appl. No.: 09/728,862

(22) Filed: Dec. 4, 2000

(65) Prior Publication Data

US 2002/0067120 A1 Jun. 6, 2002

(51) Int. Cl.$^7$ .............................. H01J 1/62; H01J 19/06; G01R 31/02; G01N 23/00; C25D 5/00
(52) U.S. Cl. ..................... 252/518.1; 252/509; 252/515; 252/519.15; 252/301.5; 313/309; 313/345; 313/346; 313/633; 205/81; 324/72; 250/311
(58) Field of Search .......................... 252/301.5, 515, 252/518.1, 519.15, 519.12, 506, 509; 205/81; 313/309, 345, 346; 324/72; 250/311

(56) References Cited

U.S. PATENT DOCUMENTS

| 3,563,797 | A |   | 2/1971 | Young et al. ............... 117/223 |
| 4,031,426 | A |   | 6/1977 | Kern .......................... 313/345 |
| 4,319,158 | A | * | 3/1982 | Watanabe et al. ....... 313/346 R |
| 5,726,524 | A | * | 3/1998 | Debe .......................... 313/309 |
| 5,985,356 | A |   | 11/1999 | Schultz et al. ................. 427/8 |
| 6,037,714 | A | * | 3/2000 | Mehrotra et al. ........... 313/631 |
| 6,051,165 | A | * | 4/2000 | Billings ....................... 252/515 |
| 6,187,164 | B1 | * | 2/2001 | Warren et al. ................ 205/81 |
| 6,280,861 | B1 | * | 8/2001 | Hosokawa et al. ......... 428/690 |
| 6,384,534 | B1 | * | 5/2002 | Srivastava et al. .......... 313/633 |
| 2003/0153725 | A1 | * | 8/2003 | Towns et al. ............... 528/373 |

FOREIGN PATENT DOCUMENTS

GB      EP 578403    *   1/1994      ............ H01J/31/12

OTHER PUBLICATIONS

"An Introduction to the Kelvin Probe", Kelvin Probe Home Web page, visited Sep. 26, 2000.
Baikie et al., 69 Rev. Sci. Instr. 11, p. 3902–3907 (1998).
Baikie et al., 70 Rev. Sci. Instr. 3, p. 1842–1850 (1999).
Blewett, "The Properties of Oxide–Coated Cathodes", Journal of Applied Physics, vol. 10, p. 668–679 (1939).

* cited by examiner

Primary Examiner—Yocendra N. Orupta
Assistant Examiner—Kallambella M Vijayakumar
(74) Attorney, Agent, or Firm—Andrew J. Caruso; Patrick K. Patnode (57) ABSTRACT

A method of making an electron emissive material using combinatorial chemistry techniques is provided. The method includes providing a plurality of pixels of the electron emissive material, each pixel having at least one different characteristic from any other one of the plurality of pixels, and measuring at least one property of each pixel. The measurement may include a measurement of the electron emissive material work function using a Kelvin probe or other work function measurement systems.

25 Claims, 4 Drawing Sheets

METHOD FOR RAPID SCREENING OF EMISSION-MIX USING A COMBINATORIAL CHEMISTRY APPROACH

BACKGROUND OF THE INVENTION

This invention generally relates to a method for preparing ceramics and more particularly to a combinatorial method for preparing electron emissive ceramic materials for lamp cathodes.

The standard emissive coating currently used on a majority of cathodes of commercial fluorescent lamps contains a mixture of barium, calcium, and strontium oxides ("the triple oxide emissive mixture"). Because these oxides are highly sensitive to $CO_2$ and water, they are placed on the lamp cathodes initially as a mixture of barium, calcium and strontium carbonates in a slurry suspension containing a binder and a solvent. The mixture of carbonates is then "activated" during the manufacturing process by resistively heating the cathodes until the carbonates decompose, releasing $CO_2$ and some CO, and leaving behind the triple oxide emissive mixture on the lamp electrode. It is believed that barium in barium oxide, in some form, is primarily responsible for the electron emission. It is also known to add a small amount of Al, Hf, Zr, Ta, W and Th dopants to the triple oxide emissive mixture, as discussed in U.S. Pat. No. 3,563,797 to Young, incorporated herein by reference in its entirety.

The triple oxide emissive mixture suffers from several disadvantages. Lamps having cathodes coated with the triple oxide emissive mixture have a higher than desired work function, which leads to a higher than desirable cathode fall voltage.

Other emissive materials for fluorescent lamps are also known. For example, U.S. Pat. No. 4,319,158 to Watanabe, incorporated herein by reference in its entirety, discloses an emissive material which comprises yttrium oxide and lanthanum oxide. This emissive material may be used in combination with the triple oxide or barium tungstate emissive materials. Furthermore, it has been previously suggested in U.S. Pat. No. 4,031,426 to Kern, incorporated herein by reference in its entirety, to substitute the triple oxide emissive mixture with barium tantalate emissive materials having various barium to tantalum ratios. While the materials of Watanabe and Kern have longer lifetimes than the triple oxide material, they have a lower efficacy than the triple oxide.

The work function of the emissive material depends on a variety of factors, such as activation schedule, morphology, composition and stoichiometry, among others. Therefore, a variety of various emissive materials have been prepared and screened in order to obtain an emissive material with a low work function. The prior art methods prepare and measure the emissive material of a given composition and stoichiometry one sample at a time. Therefore, these prior art methods are slow and inefficient. The present invention is directed to overcoming or at least reducing the effects of one or more problems set forth above.

BRIEF SUMMARY OF THE INVENTION

In accordance with one preferred aspect of the present invention, there is provided a method of making an electron emissive material, comprising providing a plurality of pixels of the electron emissive material, each pixel having at least one different characteristic from any other one of the plurality of pixels, and measuring at least one property of each pixel.

In accordance with another preferred aspect of the present invention, there is provided a method of determining a work function of a plurality of pixels of an electron emissive material, comprising providing an array of pixels of a first material on a first substrate, each pixel having at least one different characteristic from any other one of the plurality of pixels, and measuring the work function of each pixel on the first substrate using a work function measurement device.

In accordance with another preferred aspect of the present invention, there is provided a Kelvin probe combinatorial testing system, comprising a Kelvin probe apparatus, a first substrate adapted to support a plurality of pixels of a material to be tested, each pixel having at least one different characteristic from any other one of the plurality of pixels, and a computer electrically connected to the Kelvin probe apparatus containing software which analyzes a work function measured on the plurality of pixels and which provides a visual, electronic or printed output of the work function of each pixel.

DETAILED DESCRIPTION OF THE INVENTION

The present inventor has realized that a combinatorial chemistry approach may be used to rapidly screen various electron emissive material compositions to select the composition with the optimum desired property, such as the lowest work function. The preferred embodiments of the present invention provide methods for the preparation, measurement and use of emissive materials using combinatorial techniques. Preferably, the emissive material can be any material, which when coated on an electrode, emits electrons in response to a current or voltage applied to the electrode. Examples of emissive materials are the triple oxide and barium tantalate having various dopants and stoichiometries. The emissive materials are preferably suitable for use on cathodes of a fluorescent lamp. However, the emissive materials may be used in other applications, such as electron emitters for electron picture tubes, and as electron injectors for particle accelerators and as pulsed RF sources.

According to a first preferred embodiment of the present invention, a plurality of dopants of a different composition and/or of a different concentration are added to a host material. The dopants may comprise any molecules, ions or compounds which can be reacted with the host material. Once dopants have chemically reacted with the host material, an array of emissive materials is formed. The array is then tested for useful emissive properties, such as work function, efficacy and cathode fall voltage.

According to a second preferred embodiment of the present invention, an array of emissive material pixels, each having a different composition and/or stoichiometry, is deposited on a single substrate. The composition and stoichiometry of each pixel of emissive material in the array may be continuously varied by depositing the materials via several independent particulate injectors onto a large substrate, such as a conductive aluminum substrate. The deposited emissive material array can then be tested for useful emissive properties, such as work function, cathode fall voltage and/or efficacy in a fluorescent lamp.

The deposited ceramic emissive materials of the first and second preferred embodiment are preferably activated and/or sintered by heating, using heating sources such as RF or a resistive filament heater. Once the emissive materials are formed, then the various pixels of emissive material each having a unique composition and/or stoichiometry are analyzed for useful emissive properties. Preferably, a scanning Kelvin probe is used to measure a work function distribution among the pixels. The pixels which contain an emissive material having a desired work function are then selected for further testing, such as placing the emissive material of the pixel on an electrode of a fluorescent lamp. However, the work function distribution measurement is not limited to using a Kelvin probe. Any diagnostic system that can measure the work function distribution can be used instead, such as an auger spectroscopy, electrostatic force microscopy, atomic force microscopy or scanning tunneling microscopy system.

According to a first preferred embodiment of the present invention, an array of emissive materials is prepared by successively delivering dopants of materials to predefined regions on a host material, and allowing the dopants and the host material to chemically react to form at least two different emissive materials having different dopants and/or different dopant concentration (i.e., a different final composition and/or stoichiometry, respectively). In one embodiment, for example, a first dopant is delivered to a first region on a host material, and a second dopant of a different type and/or concentration is delivered to a second region on the host material. Optionally thereafter, additional dopants can be added to the first and second regions of the host material. Furthermore, different dopants and/or different dopant concentrations may be added to the third through Nth regions of the host material. In addition to the combinatorially delivered dopants, one or more dopants may already be present in the emissive host material.

The host material may be made by various ceramic processing methods. In a preferred aspect of the first embodiment, the host material comprises the barium oxide—strontium oxide—calcium oxide emissive mixture (i.e., the triple oxide). The triple oxide host emissive material is made by mixing the starting barium, strontium and calcium carbonate powders in a desired stoichiometric proportion. The mixed powder is then heated to activate or convert the carbonate powders to oxide powders and to form a solid sintered body or "cake." Preferably, the sintering takes place at a temperature of about 1300 to 1500° C. for about 1 to 10 hours. However, other appropriate sintering temperatures and durations may be used. However, other emissive host materials, such as barium tantalate may be used instead.

The dopants in the individual reaction regions of the host material are preferably prevented from moving to adjacent reaction regions. This may be accomplished by fabricating the host material into an array of pixels. There may be any desired number of pixels, such as from 2 to 10,000 pixels, preferably from 10 to 1000 pixels.

Figure 1:
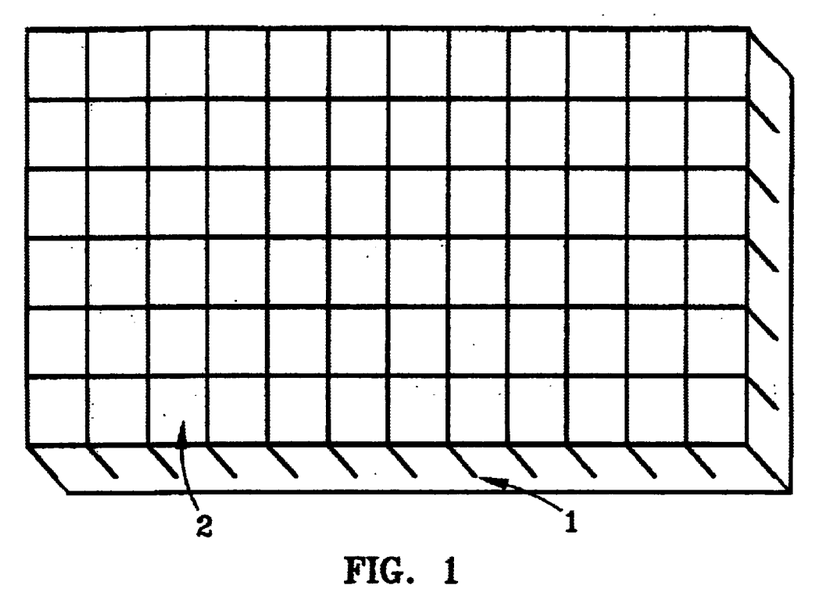
FIG. 1 is three dimensional view of a pixel array according to one aspect of the first preferred embodiment of the present invention.

In a first preferred aspect of the first embodiment, a host material 1 is fabricated into a block and then diced into individual pixels 2 or sections, as in FIG. 1. Dicing may be carried out to cut partially into or all the way through the host material 1. Pixel 2 in this instance means a pillar-like protrusion over a surface of the host material 1. Each pixel can be of any shape, such as circular or polygonal, or of various dimensions, as long as the pixel is capable of receiving discrete amounts of dopant. Pixels preferably are over about 10 microns in thickness, and in one preferred embodiment have a height of between about 100 microns to about 5 mm. Individual pixels for doping are connected to a base 1 of the host material.

Figure 2:
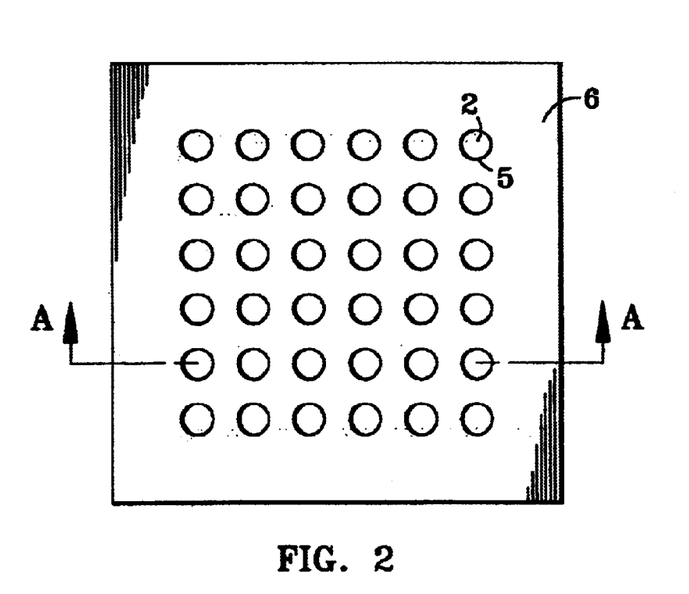
FIG. 2 is a top view of a pixel array according to another aspect of the first preferred embodiment of the present invention.
Figure 3:
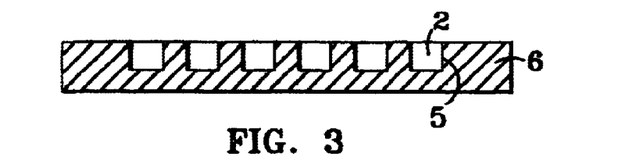
FIG. 3 is a side cross sectional view along line A—A in FIG. 2.

Alternatively, the emissive host material may be formed by casting or molding the mixed carbonate powder into a mold cavity or into a recesses on a substrate having an appropriate shape. For example, in a second preferred aspect of the first embodiment, a suspension of a binder, solvent and the mixed barium, strontium and calcium carbonate powders are placed or cast into recesses 5 in a forming substrate 6, as illustrated in FIGS. 2 and 3. The binder may comprise organic material, such as nitrocellulose, and the solvent may comprise butyl acetate, amyl acetate, methyl propanol, or the like. The suspension is then heat treated to evaporate the binder and to activate and sinter the carbonate powders to form the triple oxide emissive host material 1 pixels 2 in the recesses 5 of the substrate 6. The substrate 6 may comprise any material that is capable of withstanding the activation temperature. The dopants different type and/or concentration are then added to the host material pixels 2 in each recess 5 and reacted to form doped pixels 2. The doped pixels 2 located in the recesses 5 of the substrate 6 are then subjected to a testing or screening step. Alternatively, the pixels 2 are removed from the recesses 5 of the substrate 6 and are placed on a different testing substrate, such as an aluminum substrate prior to the testing or screening step.

Figure 4:
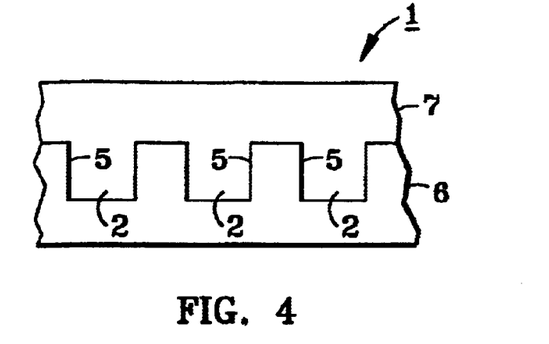
FIGS. 4 and 5 are side cross sectional views of a pixel array according to another aspect of the first preferred embodiment of the present invention.
Figure 5:
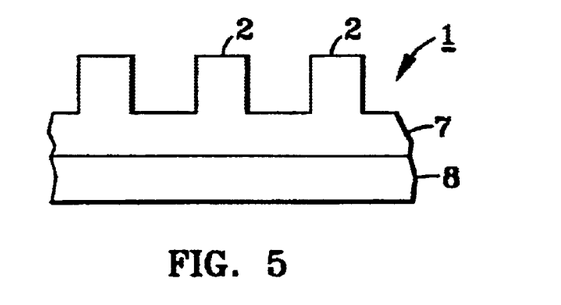

In a third preferred aspect of the first embodiment, the suspension of the binder and the starting powders is cast or injected into recesses or cavity portions 5 of the forming substrate or mold 6, respectively, such that a base portion 7 of the emissive host material 1 connects the individual pixels 2, as illustrated in FIG. 4. Once the binder is evaporated and the host material 1 is activated and sintered, it is removed from the forming substrate or mold 6 and placed with the base portion 7 down on a testing substrate 8, such as an aluminum substrate, as illustrated in FIG. 5. With the pixels 2 being distal from the substrate 8, dopants different type and/or concentration are then added to the upward facing host material pixels 2 and reacted to form doped pixels 2. The doped pixels 2 are then subjected to a testing or screening step.

The second and third aspects describe forming the host material by depositing a powder in a suspension containing a solvent and a binder. However, the binder containing suspension may be omitted, and the starting carbonate powders may be dry pressed into the desired pixel 2 shape using a dry pressing apparatus. Alternatively, the powders may be dry sintered into the solid pixels 2 while located in the recesses or cavities 5.

Figure 6:
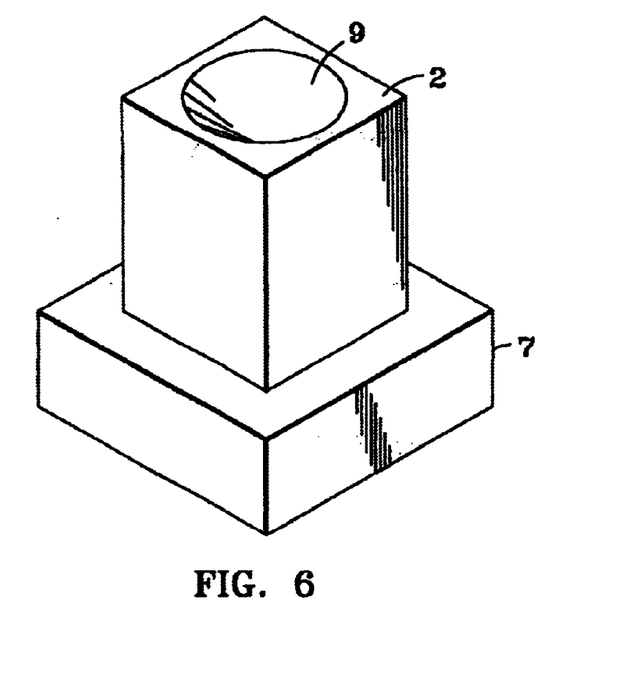
FIGS. 6 and 7 are a three dimensional and a side cross sectional view, respectively, of a pixel with a well according to one aspect of the first preferred embodiment of the present invention.
Figure 7:
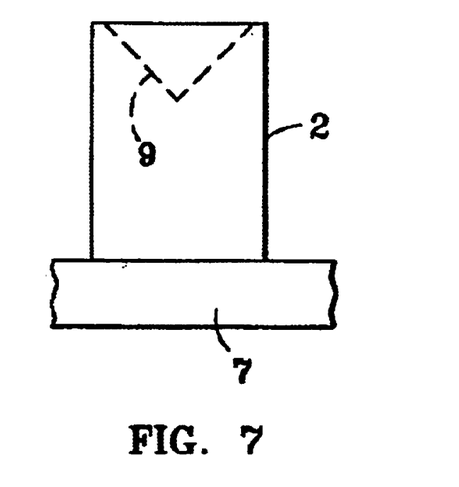

If desired, the top portions of the pixels 2 may contain wells 9 that are capable of receiving the dopant solution, as illustrated in FIGS. 6 and 7. The wells 9 may be formed by etching the top portion of each pixel 2, or by locating a protrusion in the substrate or mold 6 recesses 5.

The dopants provided into the pixels can be reacted with the pixels using a number of different conditions. For example, the dopants can be provided into activated and/or sintered emissive host material pixels 2 and then reacted with the host material by applying thermal, infrared or microwave heating to the pixels. Alternatively, the dopants can be provided into the host material prior to the activation and/or sintering steps. In this case, the dopants are reacted with the host material during the activation and/or sintering steps. Other useful reaction techniques that can be used to simultaneously react the components of interest will be apparent to one of skill in the art.

The dopants are preferably added to a single host material. Each pixel of the host material contains a different dopant type and/or concentration. By synthesizing an array of emissive materials in a single host material, screening the array for materials having useful properties is more easily carried out. Preferred dopants include rubidium (Rb), cesium (Cs), iridium (Ir), scandium (Sc) and rare earths for the triple oxide emissive host material. The dopant concentration preferably comprises from about 5% to about 50% by weight of the emissive material.

The dopants are preferably ions that added to the host material in the form of a precursor in a liquid solution. If desired, the solution may contain counter ions such as nitrate, acetate, bromide, chlorate, chloride, salicylate, stearate, sulfate, or tartrate salt dissolved in a solvent comprising water, alcohol, or mixture of water and alcohol. In one preferred aspect, oxide or carbonate compounds of the Rb, Cs, Ir, Sc and/or rare earth dopants are added to barium, strontium and carbonate host material powders in a slurry before the annealing step. The host material and dopant carbonate or oxide powders are then co-sintered. In another preferred aspect, a solution containing pure metal dopant ions, such as Rb or Ir is provided to the sintered host material pixels.

In the delivery system of the first preferred embodiment, a precisely quantified amount of each dopant is delivered into each reaction region of the host material, such as a top surface or well 9 of each pixel 2. Any dopant delivery system which is capable of delivering a precisely quantified amount of each dopant type and/or concentration may be used to deliver the dopants into the host material pixels 2. The skilled artisan will appreciate that this may be accomplished using a variety of well-known delivery techniques, either alone or in combination with a variety of masking techniques.

Dopants can be deposited into the reaction regions of interest from a dispenser in the form of droplets by a variety of techniques well known in the art. These include a micropipetting apparatus or an ink-jet dispenser system, including a pulse pressure type dispenser system, a bubble jet type dispenser system and a slit jet type dispenser system. Such dispenser systems can be manually or automatically (i.e., computer) controlled.

The dispenser system can be aligned with respect to the appropriate pixels 2 by a variety of alignment systems available in the microelectronic device fabrication and combinatorial chemistry arts. For example, the reference points or alignment marks on the surface of the pixel array can be accurately identified by using capacitive, resistive or optical sensors. Alternatively, an alignment system using a camera and an image processor can be employed.

The pixels are doped by absorbing liquid media into the pores of the ceramic emissive host material. Capillary action drives the dopant into the interstices between the ceramic grains. The solvent may be removed during the activation, sintering or reacting step.

Figure 8:
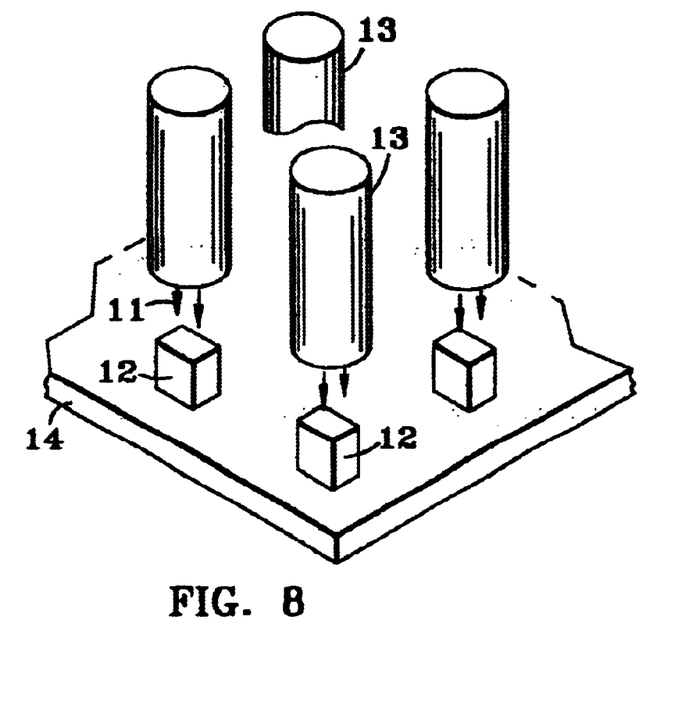
FIG. 8 is a three dimensional view of a pixel array fabrication according to the second preferred embodiment of the present invention.

According to the second preferred embodiment of the present invention, an array of pixels of emissive materials having a different composition and/or stoichiometry is deposited on a single substrate. The composition and stoichiometry of each pixel 12 of a deposited emissive material 11 in the array may be varied by depositing the materials of each pixel 12 via several independent particulate injectors 13, as illustrated in FIG. 8. The injectors 13 are positioned over a large substrate, such as a conductive aluminum substrate 14. Each injector 13 contains an emissive material precursor having a different composition and/or stoichiometry. The injectors 13 provide the emissive material 11 onto the substrate 14 to form the respective pixels 12. For example, the injectors 13 may contain a dry metal oxide powder or a metal oxide powder in a fluid suspension. The particulate injectors 13 may comprise ink jet dispensers, micropipettes, or pneumatic slurry dispensers. If desired, instead of being deposited on a flat substrate 14, the emissive material 11 may be deposited into recesses 5 of a grooved substrate 6 illustrated in FIGS. 2 and 3. The deposited pixels 12 of the host material 11 are activated and/or sintered and then screened for useful emissive properties, such as work function.

One preferred emissive material of the second preferred embodiment is barium tantalate which contains at least one of strontium, calcium and tungsten. This material has the formula $(A_{1-x}Ca_x)_p(Ta_{1-y}W_y)_qO_{r+y}$, where A comprises one of barium or a combination of barium and strontium, p=2–6, q=2–6, r=4–12, $0 \leq x < 0.5$, $0 \leq y < 1$. Tantalum has a +5 oxidation state, while tungsten has a +6 oxidation state. Therefore, the number of moles of oxygen will depend on the number of moles of tungsten in the emissive material.

Starting barium, tantalum, calcium and/or tungsten powders, such as a $BaCO_3$ powder, a $Ta_2O_5$ powder and at least one of a $CaCO_3$ powder, a $SrCO_3$ powder and a $WO_3$ powder, containing different stoichiometries and/or different elements are mixed and placed into individual injectors 13. The powders may be provided in a suspension containing a solvent and a binder, if desired. The injectors 13 then form individual emissive material pixels 12 on the substrate 14. The pixels 12 are then sintered to form a plurality of sintered pixels 12 having a unique composition and/or stoichiometry on the substrate 14. Preferably, the sintering takes place by thermal, radiative or RF heating at a temperature of about 1300° C. to about 1500° C. for about 8 to 10 hours. However, other appropriate sintering temperatures and durations may be used.

According to one preferred aspect of the second embodiment, each pixel 12 of the emissive material contains a different value of p, q, r, x and y. After each pixel 12 is deposited, its emissive properties, such as work function, are screened or tested. According to another preferred aspect of the second embodiment, each pixel 12 contains the same value of p, q and r. Preferably, p=6, q=2 and r=11 in the $(A_{1-x}Ca_x)_p(Ta_{1-y}W_y)_qO_{r+y}$ emissive material, such that each pixel of the emissive material has the following formula: $(A_{1-x}Ca_x)_6(Ta_{1-y}W_y)_2O_{11+y}$, where least one of x or y is greater than zero, and the number of moles of oxygen varies between 11 and 12. Thus, the emissive mixture is a solid solution of $(A_{1-x}Ca_x)_6Ta_2O_{11}$ and $(A_{1-x}Ca_x)_6W_2O_{12}$ when the emissive mixture contains tungsten.

The emissive material having a 6:1 barium oxide to tantalum pentoxide molar ratio (i.e., a Ba/Ta ratio of 3) that contains calcium and/or tungsten has improved properties, such as a lower work function, compared to a similar emissive material that lacks calcium and/or tungsten, as well as compared to emissive mixtures having other barium oxide to tantalum pentoxide molar ratios (such as 5:2 or 4:1 ratios, which correspond to Ba/Ta ratios of 1.25 or 2, respectively). Thus, each pixel 12 of the emissive material preferably contains the same value of p, q and r, but a different value of x and y. For example, the preferred calcium amount, x, of the emissive material is greater than zero and less than 0.4, preferably $0.1 \leq x \leq 0.3$, while the tungsten amount may be zero or greater than zero. The preferred tungsten amount is greater than zero and less than 0.75, preferably $0.25 \leq x \leq 0.5$, while the calcium amount may be zero or greater than zero. Most preferably, the emissive mixture contains non-zero amounts of calcium and tungsten. Therefore, each pixel 12 has a different stoichiometry from the other pixels (i.e., a different value of x and/or y) or a different composition from the other pixels (i.e., contains Ca or W that is not contained in other pixels).

Another preferred emissive material of the second embodiment comprises a two-component yttrium oxide $(Y_2O_3)$ and lanthanum oxide $(La_2O_3)$ material 11. The emissive material 11 contains 0.5 to 80 molar percent $La_2O_3$ and 99.5 to 20 molar percent $Y_2O_3$. Thus, each pixel 12 has a unique stoichiometry by virtue of having a different $La_2O_3:Y_2O_3$ molar ratio, which preferably ranges from 19:1 to 1:9.

In another preferred aspect of the second embodiment, the emissive material 11 further contains a third component in addition to the $La_2O_3$ and $Y_2O_3$ components. Preferably, the third component contains barium and oxygen, and may be selected from $((Ba,Sr)_{1-x}Ca_x)_p(Ta_{1-y}W_y)_qO_{r+y}$,(Ba,Sr,Ca)$_3WO_6$, BaO,BaO or the triple oxide (BaO*CaO*SrO). The third component preferably comprises 70 to 99 molar percent of the emissive material. Thus, each pixel 12 may have a different stoichiometry by virtue of having a different $La_2O_3:Y_2O_3$ molar ratio or and/or a different composition if the pixel contains a different third component element. Furthermore, the stoichiometry of each pixel 12 may be varied by varying the amount and/or the stoichiometry of the barium oxide containing third component of the emissive material, while the molar ratio of $La_2O_3:Y_2O_3$ is either the same or different in each pixel 12.

Another preferred emissive material of the second embodiment comprises a three component barium oxide, strontium oxide and calcium oxide (i.e., triple oxide) material. The emissive material of each pixel 12 contains a different molar ratio of each oxide, which provides a unique pixel stoichiometry.

Figure 9:
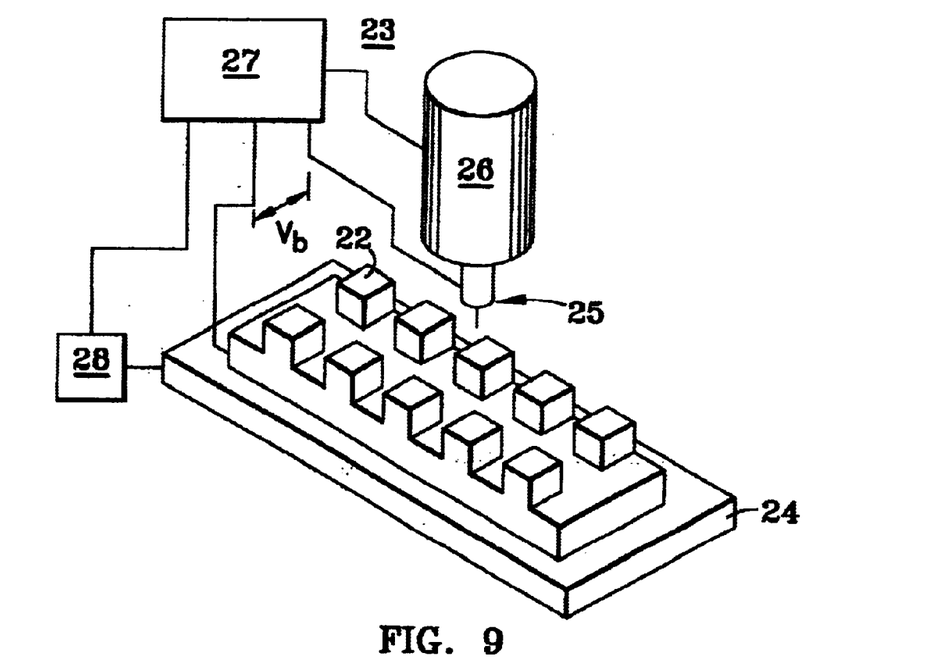
FIG. 9 is a three dimensional view of a Kelvin probe system for screening a pixel array according to the preferred embodiments of the present invention.

The pixels 2, 12 produced according to the first or second preferred embodiments are subsequently tested or screened for useful electron emissive properties. Preferably, the emissive property determined is the work function of each pixel. Most preferably, the work function of the pixels 22 on a substrate 24 is determined by using a Kelvin probe 23, as illustrated in FIG. 9. A Kelvin probe 23 is a vibrating capacitor device which measures the work function (also termed surface potential for non-metal materials) of a sample.

Any Kelvin probe may be used to measure the work function of the emissive material pixels 22. For example, a Kelvin probe 23 disclosed in Baikie et al., 69 Rev. Sci. Instr. 11, 3902 (1998), incorporated herein by reference, may be used. This Kelvin probe 23 contains a reference electrode or probe tip 25 suspended above the pixels 22, thus creating a simple capacitor. The reference electrode 25 is vibrated in the vertical (i.e., z) direction by a voice coil element 26 containing a coil driver, magnets and springs. Control electronics 27, which include elements such as a computer, digital to analog converter, a voltage detector and an oscillator, control the amplitude, height and frequency of oscillation of electrode 25 and the voice coil element 26. The control electronics also 27 provide a reverse bias or backing voltage, $V_b$, between the pixels 22 and the reference electrode 25. The computer contains software which analyzes the work function measured on the plurality of pixels 22 and provides a visual, electronic or printed output of the distribution of work functions for each pixel.

The Kelvin probe 23 operates as follows. When the reference electrode or tip 25 is contacted to the pixel 22, electrons flow from the electrode 25 having a lower work function, to the pixel 22 having a higher work function, which produces a contact potential or voltage, $V_c$ across the Kelvin capacitor 22/25. The variable reverse bias or backing voltage, $V_b$, is applied between the electrode 25 and the pixel 22. The value of $V_b$ is continuously monitored. When value of the variable $V_b$ equals to $V_c$, no potential difference exists between the electrode 25 and the pixel 22. The work function of the emissive material of each pixel 22, $\Phi$, can then be determined from the following equation: $\Phi=eV_b$, where $e=1.6\times10^{-19}$ coulombs and $V_b=V_c$ (i.e., the value of $\Phi$ is determined when no potential difference between the electrode 25 and the pixel 22 is detected).

The reference electrode or tip 25 can be used to sequentially detect the work function of every pixel 22 in the array by moving the substrate 24 below the electrode 26. The substrate 24 may be moved manually or by using an XY stage driver 28 controlled by the control electronics 27. Alternatively, the electrode 25 may be moved relative to a stationary substrate.

Figure 10:
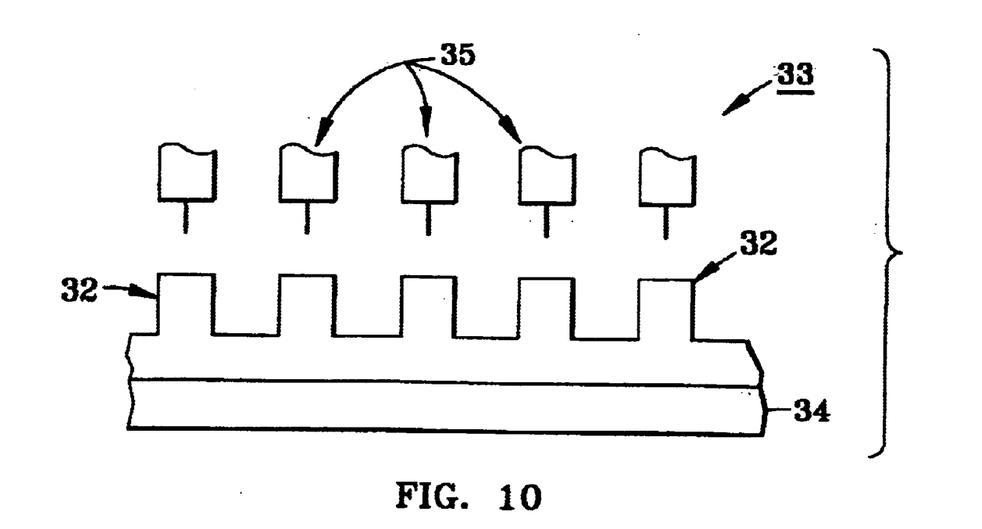
FIG. 10 is a side cross sectional view of a multitip Kelvin probe system for screening a pixel array according to the preferred embodiments of the present invention.

Alternatively, the work functions of all pixels 22 in the array may be detected simultaneously by using a multitip Kelvin probe 33 illustrated in FIG. 10. An example of a multitip Kelvin probe 33 is provided in Baikie et al., 70 Rev. Sci. Instr. 3, 1842 (1999), incorporated herein by reference. The probe 33 contains a plurality of reference cathodes or tips 35 which are aligned to the individual pixels 32 on a substrate 34. Thus, the work function of each pixel 32 can be simultaneously determined by contacting each pixel 32 with the respective electrode 35 at the same time.

After each pixel is screened to determine a useful emissive property, such as work function, the emissive materials which comprise the pixels having the desired properties are provided for further testing. For example, the emissive materials may be coated onto fluorescent lamp cathodes and the lifetime, efficacy and/or cathode fall measurements may be carried out. The emissive materials, whose composition and stoichiometry were determined by the combinatorial chemistry methods may then be placed onto cathodes of commercially provided devices, such as fluorescent lamps. Thus, the composition and the stoichiometry of a pixel having a desired value of work function is selected, an electron emissive material having the selected composition and stoichiometry is produced and placed onto an electrode of a fluorescent lamp. The fluorescent lamp includes a shell, a phosphor formed on an inner surface of the shell, at least one electrode and the electron emissive whose composition was determined by the above method.

The Kelvin probe 23, 33 may be used to measure the work function of a plurality of emissive material pixels provided on a substrate by a combinatorial chemistry method. However, the Kelvin probe 23, 33 also may be used to measure the work function of a plurality of other organic or inorganic materials provided on a substrate by a combinatorial chemistry method, where the composition and/stoichiometry of each pixel of such material is different from the other pixels in the array.

Furthermore, while a Kelvin probe has been described as a device which measures the work function, other devices may be used instead. For example, Auger spectroscopy, scanning tunneling microscopy, electrostatic force microscopy or atomic force microscopy may be used to measure the work function of the pixels. For example, the work function of the pixels may be sequentially measured by scanning a cantilevered tip of an atomic force microscope over each pixel. Alternatively, the work function of the pixels may be simultaneously measured by providing one of a plurality of cantilevered tips of an atomic force microscope over each respective pixel.

While the invention has been described in detail and with reference to specific embodiments thereof, it will be apparent to one skilled in the art that various changes and modifications can be made therein without departing from the scope of the invention.

What is claimed is:

1. A method of making an electron emissive material, comprising:
    providing an array of pixels of the electron emissive material, each pixel having a different composition or stoichiometry than the other pixels of the array, wherein the emissive material comprises $(A_{1-x}, Ca_x)_p(Ta_{1-y}, W_y)_q O_{r+y}$, wherein A comprises one of barium or a combination of barium and strontium, p=2–6; q=2–6r=4–12; $0 \leq x \leq 0.5$; and $0 \leq y > 1$ and each pixel has a different value of at least one of p, q, r, x and y from the other pixels; and
    measuring at least one property of each pixel.
2. The method of claim 1, wherein the at least one property comprises work function.
3. The method of claim 1, wherein the step of providing comprises:
    providing a first dopant to a first pixel of a host material;
    providing a second dopant of a different type or concentration than the first dopant to a second pixel of the host material;
    reacting the dopants with the host material to provide a first and a second pixel of an array of pixels of the electron emissive material.
4. The method of claim 4, wherein the step of providing further comprises:
    providing a plurality of dopants to the array of pixels of the host material, wherein a dopant provided to each pixel is of a different type or concentration than a dopant provided to other pixels; and
    reacting the dopants with the host material to provide the array of pixels of the electron emissive material.
5. The method of claim 4, wherein:
    each pixel of the host material comprises a triple oxide comprising barium oxide, strontium oxide and calcium oxide; and
    the dopant comprises at least one of rubidium, iridium, cesium, scandium and rare earths.
6. The method of claim 5, further comprising:
    providing a different concentration of the dopants to each pixel of the host material having a same composition and stoichiometry;
    reacting the dopant and the host material to form the array of pixels where pixel each pixel has a different composition or stoichiometry from any other one of the plurality of pixels.
7. The method of claim 6, further comprising:
    providing a liquid solution of the dopant in a solvent into wells in a top portion of the host material of each pixel; and
    heating the pixel array to react the dopant and the host material.
8. The method of claim 7, further comprising:
    providing a block of a host material; and
    dicing the block into a plurality of pixels of host material.
9. The method of claim 7, further comprising:
    providing a suspension containing a starting metal oxide powder into a plurality of cavities on a first substrate; and
    heating the suspension to provide the host material pixel array, wherein each pixel is located in a respective cavity.
10. The method of claim 9, further comprising:
    providing a host material base connecting the plurality of pixels located in the plurality of cavities on the first substrate;
    removing the host material from the first substrate; and
    placing the base onto a second substrate such that the plurality of pixels are distal from the second substrate.
11. The method of claim 2, wherein the step of providing comprises:
    providing a first pixel of a host material;
    providing a second pixel of the host material having a different composition or stoichiometry than the first pixel.
12. The method of claim 1, further comprising:
    providing a particulate material having a different composition or stoichiometry from a plurality of independent particulate injectors; and
    heating the particulate material to provide the array of emissive material pixels.
13. The method of claim 1, wherein:
    the emissive material comprises $(A_{1-x}Ca_x)_6(Ta_{1-y}W_y)_2O_{11+y}$, where least one of x or y is greater than zero;
    each pixel has a different value of at least one of x and y from the other pixels;
    $0 \leq x \leq 0.4$; and
    $0 \leq y \leq 0.75$.
14. The method of claim 1, wherein:
    the emissive material comprises $Y_2O_3$ and $La_2O_3$; and
    each pixel contains a different molar ratio of $Y_2O_3$ to $La_2O_3$.
15. The method of claim 14, wherein the emissive material further comprises a material containing barium and oxygen.
16. The method of claim 2, wherein the measurement comprises measuring the work function of the emissive material using Auger spectroscopy, scanning tunneling microscopy, electrostatic force microscopy or atomic force microscopy.
17. The method of claim 2, wherein the measurement comprises measuring the work function of the emissive material using a Kelvin probe.

18. An array of an electron emissive material pixels made by the method of claim 2.

19. The method of claim 2, further comprising:

selecting the composition and the stoichiometry of a pixel having a desired value of work function;

producing an electron emissive material having the selected composition and stoichiometry; and placing the electron emissive material onto an electrode of a fluorescent lamp.

20. A method of determining a work function of a plurality of pixels of an electron emissive material, comprising:

providing an array of pixels of a first material on a first substrate, each pixel having at least one different characteristic from any other one of the plurality of pixels wherein the first material comprises an electron emissive material selected from a group consisting of:
(a) barium oxide, strontium oxide and calcium oxide;
(b) yttrium oxide and lanthanum oxide; and
(c) $(A_{1-x}, Ca_x)_6(Ta_{1-y}, W_y)_2O_{11+y}$, wherein A comprises one of barium or a combination of barium and strontium: $0 \leq x > 0.5$; $0 \leq y > 1$; and at least one of x and y is greater than zero; and measuring the work function of each pixel on the first substrate using a work function measurement device.

21. The method of claim 20, wherein:

the first material comprises a ceramic electron emissive material; and the work function measurement device comprises a Kelvin probe.

22. The method of claim 21, wherein the at least one characteristic comprises composition or stoichiometry.

23. The method of claim 21, further comprising:

positioning a Kelvin probe tip over a first pixel;

measuring the work function of the first pixel;

moving the first substrate relative to the Kelvin probe tip, such that the Kelvin probe tip is positioned over a second pixel; and measuring the work function of the second pixel.

24. The method of claim 21, further comprising:

positioning a plurality of Kelvin probe tips over a plurality of respective pixels; and simultaneously measuring the work function of the plurality of pixels.

25. The method of claim 20, wherein the work function measurement device comprises a scanning tunneling microscope.

* * * * *